UNITED STATES PATENT OFFICE.

GEORGE FRANÇOIS JAUBERT, OF PARIS, FRANCE.

PROCESS OF MANUFACTURING OXYGENATED SALTS.

1,047,645.

Specification of Letters Patent. Patented Dec. 17, 1912.

No Drawing. Application filed March 25, 1909. Serial No. 485,685.

*To all whom it may concern:*

Be it known that I, GEORGE FRANÇOIS JAUBERT, of 155 Boulevard Malesherbes, Paris, France, have invented certain new and useful Improvements in and Relating to Processes of Manufacturing Oxygenated Salts, of which the following is a specification.

This invention relates to a process of manufacturing oxygen-containing salts which are quite stable when dry but are readily dissociated on being dissolved in water, to produce hydrogen peroxid.

In accordance with the invention the new salts are derived from those true peroxids which in the presence of an acid normally give peroxid of hydrogen. These peroxids include the alkaline, alkaline-earthy and earthy peroxids such as for example peroxid of sodium, potassium, calcium, strontium, barium, magnesium, zinc and the like. When a mineral acid or a free organic acid is allowed to act upon such a peroxid there is formed peroxid of hydrogen and the salt of the acid employed, according to the following equation:

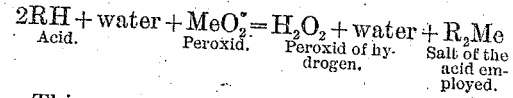

This process has heretofore been commonly employed for the industrial manufacture of peroxid of hydrogen by the action of an appropriate acid diluted by water (such for example as sulfuric, fluosilicic, hydrofluoric, carbonic or the like) on peroxid of barium.

Broadly speaking the present invention is characterized by the fact that instead of bringing about the reaction in the presence of water or other fluid, in which the hydrogen peroxid normally produced by such a reaction might be dissolved, the reaction is brought about in the absence of such a possible solvent for hydrogen peroxid and the active oxygen liberated by the reaction combines with the resulting salt instead of combining with the hydrogen of the acid to form an aqueous solution of hydrogen peroxid.

Where the reaction between the acid and the peroxid is of a less energetic nature, it may take place directly without any dilution, but where the nature of the reaction is more energetic I prefer to employ a diluting agent in which the peroxid of hydrogen is insoluble or at most only slightly soluble.

Generally speaking the reaction may be carried on directly without a diluting agent when treating alkaline-earthy, or earthy peroxids, but when alkaline peroxids are treated, the reaction is more energetic and the diluting agent, as for example air, or a liquid such as acetone, the chlorinated derivatives of carbon, the hydrocarbons, or like bodies which are not solvents of the peroxid of hydrogen should be employed. If the acid to be diluted is in the gaseous state, for example as hydrochloric acid as noted later in Example 1, it must be diluted by means of a gas such as air, or an anhydrous vapor and not by means of water. When the reaction is thus brought about in the absence of a solvent of the peroxid of hydrogen, and is so controlled as to prevent an excessive rise in temperature, it results in the formation of solid salts containing all the active oxygen of the peroxid.

*Example No. 1—Perchlorid of sodium.—* Eight kilograms of peroxid of sodium are suspended in 100 liters of tetrachlorid of carbon and then dry hydrochloric acid gas is passed slowly through the mixture, which is energetically stirred, care being also taken to avoid any rise in temperature. The best results are obtained at a temperature between 0° and 10° centigrade, while the highest temperature permissible is between 15° and 20° centigrade. The hydrochloric acid is entirely absorbed, in the proportion of two molecules of hydrochloric acid to one molecule of peroxid of sodium. When by weighing it has been ascertained that 7.5 kilograms of hydrochloric acid have been absorbed, the white precipitate is filtered and dried. This precipitate consists of about 15.5 kilograms of perchlorid of sodium, a white powder very soluble in water and containing about ten per cent. of active oxygen. The reaction takes place according to the following equation:

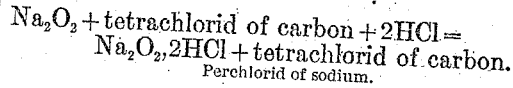

*Example No. 2.—Performiate of soda.—* Eight kilograms of peroxid of sodium are suspended in 100 liters of tetrachlorid of carbon and then 9.5 kilograms of pure formic acid are slowly added, stirring vigorously all the time. Each drop of formic acid occasions a slight explosion accompanied by a flame. The formic acid should be added so slowly as to prevent a rise in temperature of the mass above 30 degrees centigrade. When all the acid has been added the liquid is filtered and the precipitate is pressed and dried. This precipitate consists of about 17 kilograms of performiate of soda, a white powder soluble in water and containing about 9.4 per cent. of active oxygen. The reaction takes place according to the following equation:

$$Na_2O_2 + \text{tetrachlorid of carbon} + 2HCOOH =$$
$$Na_2O_2.2CH_2O_2 + \text{tetrachlorid of carbon.}$$
Performiate of sodium.

*Example No. 3—Persalt of soda of acetic ether.*—Eight kilograms of peroxid of sodium are suspended in eighty liters of chloroform, and then 12 liters of acetic ether are slowly added. The mass rises slightly in temperature, consequently care must be taken that it does not surpass 30 degrees centigrade. The liquid is then filtered and the precipitate is pressed and dried. This precipitate consists of about fifteen kilograms of a persalt of soda of acetic ether containing about nine per cent. of active oxygen. The reaction takes place according to the following equation:—

$$Na_2O_2 + \text{chloroform} + CH_3CO.OC_2H_5 =$$
$$CH_3CO_2Na(ONa)OC_2H_5 + \text{chloroform.}$$

*Example No. 4—Perbenzoate of soda.*—Twelve and a half kilograms of benzoic acid are mixed with 100 liters of tetrachlorid of carbon, and then 4 kilograms of peroxid of sodium are slowly added. The resulting precipitate consists of 16 kilograms of perbenzoate of soda containing about five per cent. of active oxygen. The reaction takes place according to the following equation:—

$$Na_2O_2 + \text{tetrachlorid of}$$
$$\text{carbon} + 2C_6H_5COOH =$$
$$Na_2O_2,2C_6H_5CO_2H + \text{tetrachlorid of carbon.}$$

The above described reactions being general, it will be understood that in these examples the peroxid of sodium may be replaced by an equivalent quantity of peroxid of potassium, calcium, strontium, barium, magnesium or zinc, and the hydrochloric acid, formic acid, or benzoic acid, by any other mineral acid or organic acid, such as acetic acid, propionic acid, or any other fatty or aromatic acid of the formula $R(COOH)n$, R being a fatty or aromatic radical and $n$ being an index which may vary from 1 to 6. Likewise the acetic ether may be replaced by other analogous ether salts such as methyl acetic ether, acetylocetic ether, etc.

The invention permits of obtaining from the peroxids true stable salts which in general, though very stable when dry, are immediately dissociated upon being dissolved in water, producing peroxid of hydrogen. The new salts produced are generally available as oxidizing agents.

It is to be clearly understood that in the claims the term "acid" includes ether salts or esters.

I claim—

1. The improvement in the process of manufacturing oxygenated salts, by the reaction of an acid on those true peroxids which in the presence of an acid and water normally form hydrogen peroxid and the salt of the acid employed, which improvement consists in causing the said reaction to take place in the absence of a solvent of hydrogen peroxid, thereby combining directly with the salt the active oxygen developed by the reaction.

2. The improvement in the process of manufacturing oxygenated salts, by the reaction of an acid on those true peroxids which in the presence of an acid and water normally form hydrogen peroxid and the salt of the acid employed, which improvement consists in causing the said reaction to take place at a reduced temperature and in the absence of a solvent of hydrogen peroxid, thereby combining directly with the salt the active oxygen developed by the reaction.

3. The improvement in the process of manufacturing oxygenated salts by the reaction of an acid on those true peroxids which in the presence of an acid and water normally form hydrogen peroxid and the salt of the acid employed, which improvement consists in causing the said reaction to take place in the presence of a diluting agent in which hydrogen peroxid is substantially insoluble, thereby combining directly with the salt the active oxygen developed by the reaction.

In testimony whereof I have hereunto placed my hand at Paris, France, this 16th day of March 1909.

GEORGE FRANÇOIS JAUBERT.

In the presence of—
H. C. COXE,
HENRY SCHWAB.